(12) United States Patent
Hudson

(10) Patent No.: US 6,448,889 B1
(45) Date of Patent: Sep. 10, 2002

(54) SATELLITE G.P.S. CONNECTED AND BAR-CODED REGISTERED VEHICLE LICENCE PLATE SATPLATE

(76) Inventor: Anthony Gerard Hudson, 4 Rosemount Court, Terranora, New South Wales 2486 (AU)

(*) Notice: Subject to any disclaimer, the term of this patent is extended or adjusted under 35 U.S.C. 154(b) by 94 day.

(21) Appl. No.: 09/589,595

(22) PCT Filed: Dec. 16, 1998

(86) PCT No.: PCT/AU98/01034

§ 371 (c)(1),
(2), (4) Date: Jun. 16, 2000

(87) PCT Pub. No.: WO99/32329

PCT Pub. Date: Jul. 1, 1999

(30) Foreign Application Priority Data

Dec. 18, 1997 (AU) .............................. 48488/97

(51) Int. Cl.⁷ ................................ B60Q 1/00
(52) U.S. Cl. .................. 340/425.5; 340/933; 340/941; 340/539; 340/825.36; 340/825.49; 342/51; 343/713

(58) Field of Search ............... 340/933, 425.5, 340/941, 928, 825.3, 825.31, 825.32, 825.36, 825.54, 825.49; 362/83.2; 342/44, 51; 343/711, 713

(56) References Cited

U.S. PATENT DOCUMENTS 5,568,406 A  10/1996  Gerber
5,657,008 A  * 8/1997  Bantli ........................ 340/933

FOREIGN PATENT DOCUMENTS

GB          2256072         11/1992
GB          2294843         5/1996
WO    PCT/AU96/05860       11/1996

* cited by examiner

Primary Examiner—Daryl C. Pope
(74) Attorney, Agent, or Firm—Shoemaker and Mattare

(57) ABSTRACT

An apparatus attachable to a vehicle, that may be in the configuration of a licence plate that can transmit the position of a vehicle to a telecommunications satellite or a telecommunications ground base station, and is particularly concerned with enabling authorities to police the vehicle with respect to its identity, location, theft and condition, as well as unlawful tampering of the apparatus.

19 Claims, 3 Drawing Sheets

# SATELLITE G.P.S. CONNECTED AND BAR-CODED REGISTERED VEHICLE LICENCE PLATE SATPLATE

RELATED APPLICATIONS

This application claims priority to international application PCT/AU98/01034 having a filing date of Dec. 16, 1998.

BACKGROUND ART

In Australia, 122,000 cars were stolen in 1996 and this figure has since increased by approximately 9% each year. Likewise, insurance claims on car theft, currently at approximately $500 million per year, are also likely to increase at a rate of 9% per annum. These escalating costs represent just some of the problems inherent to the system operating in Australia today, costs that are ultimately absorbed by the public. Improving the current method of policing alone could pass on significant savings to the public in terms of lower vehicle registration and insurance fees.

It is an objective of the present invention to provide an apparatus which may ameliorate some of the above disadvantages.

SUMMARY OF THE INVENTION

According to one aspect of the present invention there is provided license plate apparatus attachable to a vehicle, said apparatus comprising a housing which is attachable externally to said vehicle and adapted to carry vehicle licence information, a transmitter within said housing which can transmit the position of said vehicle to a satellite or to a telecommunications base station, and sensing means within said housing for activating said transmitter in the event that breach of, or tampering with, said housing is sensed.

In one form, the housing is airtight and is pressurized or depressurized, and the tamper evident means comprises a pressure detector which activates the transmitter if the pressure changes in the housing, such as upon breaching of the interior or by deformation of the housing say by a collision or due to other tampering.

In a further form, the housing is airtight and may contain a gas and the tamper sensing means comprises a gas detector in the housing which will activate the transmitter upon sensing a breach of the housing and thus loss of gas say due to a vehicle collision or tampering with the housing or apparatus.

Where the housing is pressurized or depressurized, or contains a gas, the housing may include a pressure valve which may be the receptor and release valve for the purpose of pressurizing the interior of the apparatus or supplying the gas to the housing.

A heat sensing means may also be provided in the housing which will activate the transmitter upon sensing a temperature in excess of normal ranges, such as upon fire in the vehicle or external heat application during attempted tampering with the apparatus.

An activatable and deactivatable motion sensing means may also be provided in the housing which, when activated, will activate the transmitter upon sensing unauthorized or unexpected motion of the housing.

The housing may also incorporate a camera lens which may photograph or capture visual images at the front of the housing.

Suitably the transmitter is connected to an antenna in the housing and is interfaced to a global positioning system in the housing from which position information may be derived for transmitting to the satellite or telecommunications base station to identify the location of the vehicle.

Suitably the housing includes a first part having visual information thereon comprising license plate information and a second part of similar dimensions to the first part and being cooperable with the first part. The first part may be connected structurally and electrically to the second part. An internal locking system may be provided within the housing for selectively locking the two parts of the housing together and enabling unlocking of the two parts of the housing.

The first part suitably comprises a fascia formed say of a transparent or other material and the second part may comprise a hollow open fronted casing formed of metal, plastics or any other material.

The housing suitably contains the sensing means, and a series of associated programmed or programmable microchips for monitoring the sensing means.

The apparatus may also include an electronic bar code inside the housing for discrimination by a bar code scanner.

The exterior of the second part of the housing may have attached energy cells electrically connected to a battery within the sealed interior of the housing for power supply to the components and devices of the apparatus. The energy cells suitably comprise solar energy cells.

The housing may also include an option port protruding to the exterior of the housing from the interior for the exchange of information between the programmed or programmable microchips within the housing and an external computer. The option port may also provide for the supply of power to the components and devices within the housing from a power source of the vehicle such as the vehicle battery. The option port may also provide for connection to an in-car immobiliser to immobilize the vehicle if tampering with the housing or any other unauthorized event is sensed.

The option port may also provide for connection to an onscreen display inside the cabin of the vehicle. The option port may also provide for a connection from the camera lens inside the housing to any film or display apparatus inside the vehicle. The option port may also provide for entering information into the programmable microchips so as to activate the locking or unlocking device between the first and second portions of the housing whereby the locking or unlocking devices may be activated remotely.

The transmitter may transmit various forms of information to the receiving authorities, including visual information, electronic information from the bar code, electronic information by access through the option port and electronic information from a global positioning satellite.

In a further aspect, the present invention provides license plate apparatus for a vehicle, said apparatus comprising: a sealed housing adapted to carry vehicle license information; a global positioning system and a transmitter within said housing, and sensing means associated with said housing for activating said transmitter for transmitting a position signal derived from said global positioning system to identify the position of said vehicle when breach of or unauthorized tampering with said housing is sensed.

The housing suitably comprises first and second cooperable parts, the one part comprising a planar portion carrying the vehicle licence information and the other part comprising a hollow open fronted casings adapted to be closed by the one part.

In a further aspect, the present invention provides apparatus attachable externally to a vehicle for identifying the location of said vehicle, said apparatus comprising means for carrying vehicle license information; geographical position identifying means and transmitter means supported rearwardly of said vehicle license information carrying means; and means for sensing tampering with said apparatus, said sensing means causing said transmitter means to transmit the position of said vehicle derived from said geographical position identifying means when tampering with said apparatus is sensed. The transmitter means may transmit the vehicle position to a satellite or telecommunications base station.

The apparatus may also include motion sensing means which activates said transmitter means upon sensing unauthorized motion of said housing. The apparatus may also be connected to a vehicle immobilizer and include a camera lens for capturing visual information forwardly of the apparatus. The geographical location identifying means may comprise a global positioning system (G.P.S.).

BRIEF DESCRIPTION OF THE DRAWINGS

A preferred embodiment of the invention will now be described with reference to the accompanying drawings in which:

FIG. 2 is a front plan view of the license plate apparatus shown in FIGS. 1b and 1c, but excluding the fascia shown in FIG. 1a.

DETAILED DESCRIPTION OF THE PREFERRED EMBODIMENT

Figure 1A:
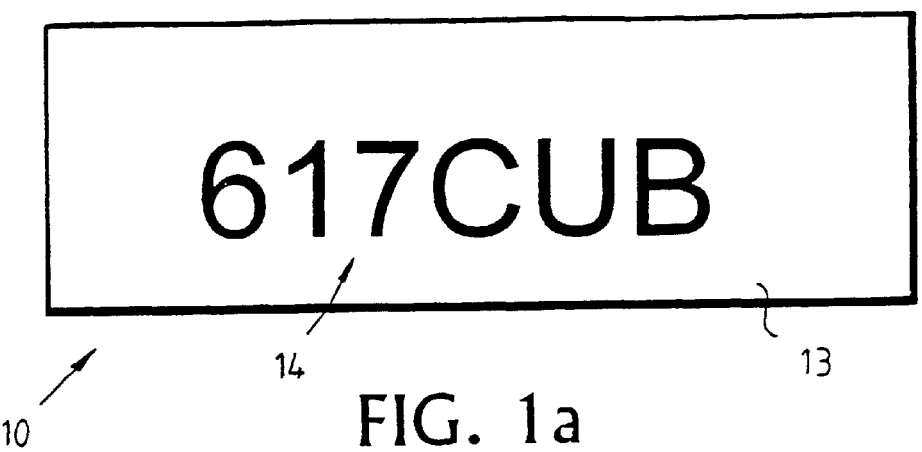
FIG. 1a is a front view of the license plate apparatus according to an embodiment of the invention.
Figure 1B:
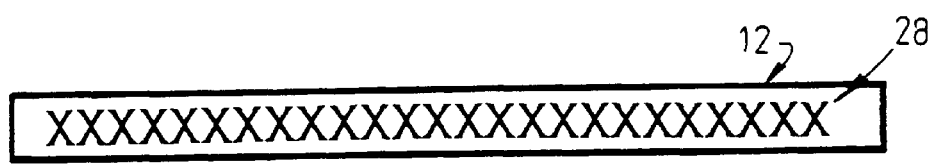
FIG. 1b is a top view of the license plate apparatus depicted in FIG. 1a but not showing the fascia.
Figure 1C:
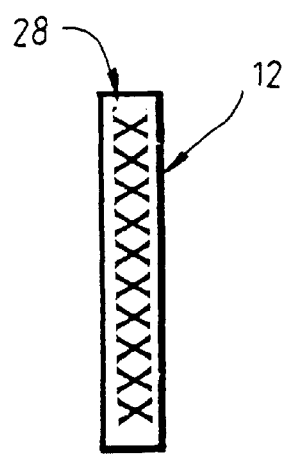
FIG. 1c is a side view of the license plate apparatus depicted in FIG. 1b but not showing the fascia.
Figure 2:
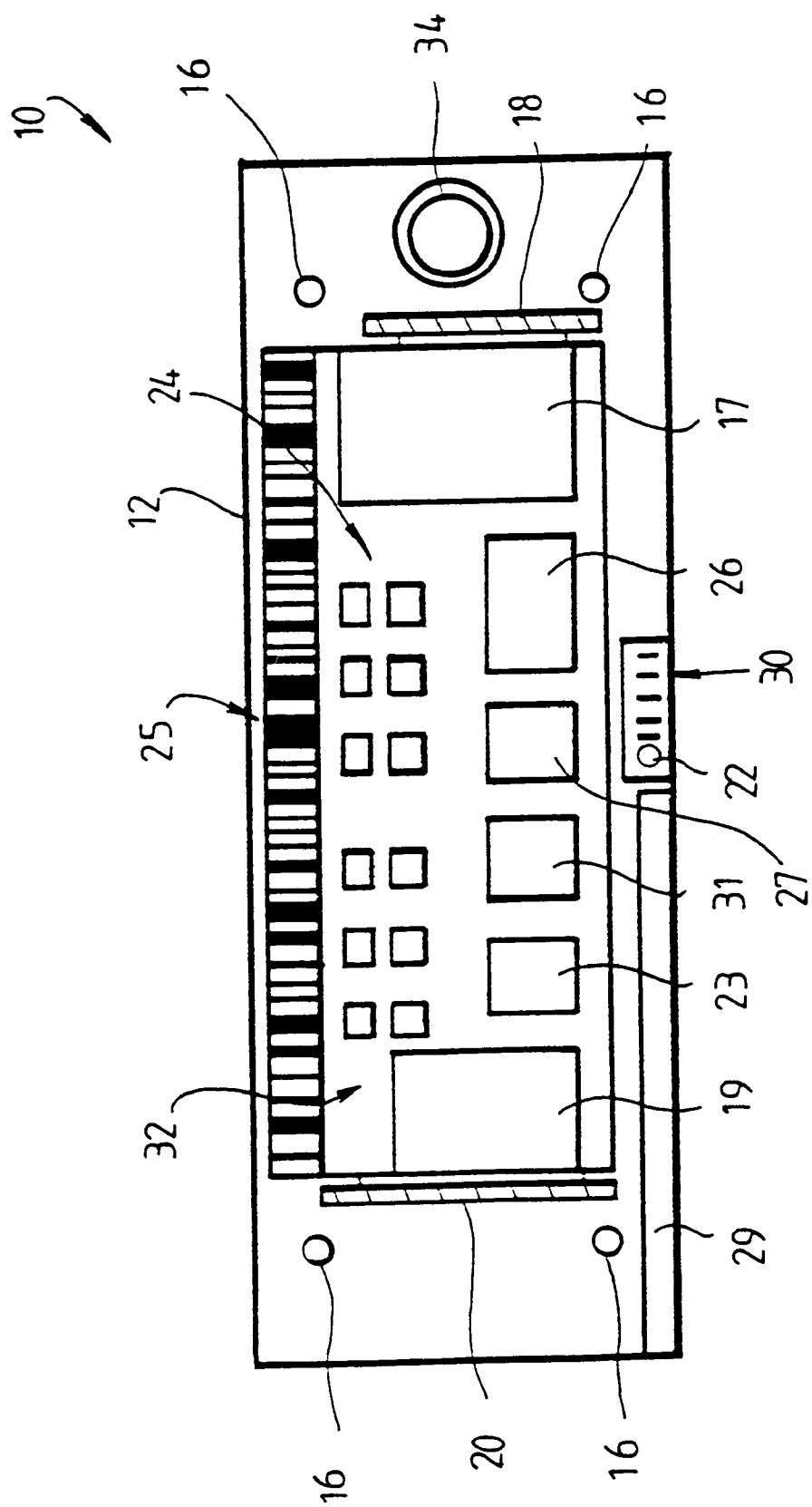

Referring to the drawings, there is illustrated apparatus 10 according to an embodiment of the invention in the form of a registered vehicle license plate which is attachable to a vehicle such as a car, boat, truck, motorcycle, trailer, caravan, or any other vehicle which is deemed to be registered to travel upon any public roadway. As the state or federal laws of a particular country have the powers to enforce, the apparatus 10 may be fixed to the vehicle by welding, bolting, torque bolts, the use of adhesives or any other attachable means.

Figure 3:
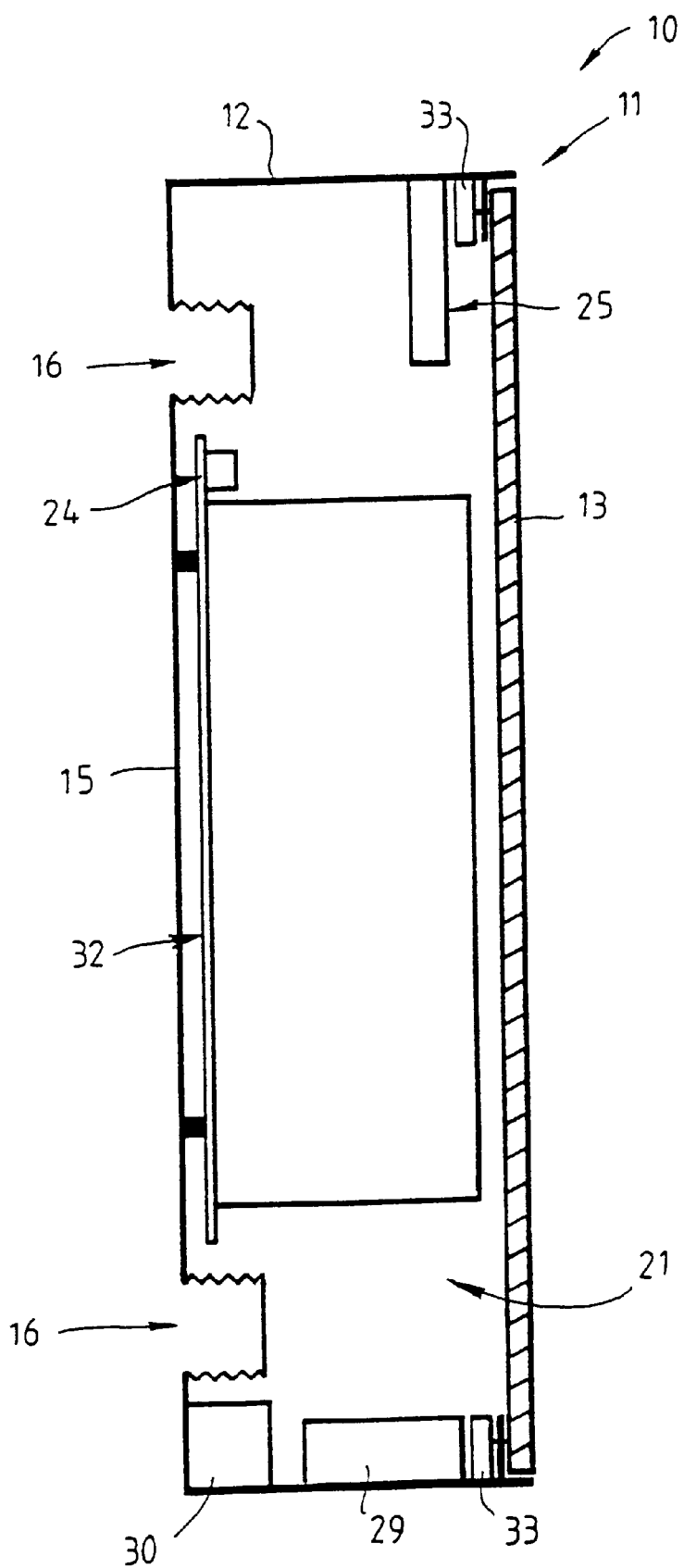
FIG. 3 is a sectional side view of the license plate apparatus shown in FIGS. 1c and 2.

The license plate apparatus 10 includes a housing 11 which is able to withstand a reasonable impact and which includes as shown more clearly in FIG. 3 a hollow casing 12 which can be made of alloy, plastic, graphite, Kevlar, fibreglass, or titanium and which is open at the front to be closed by a front fascia 13 which may comprise a laminated glass fascia, plated glass fascia, perspex fascia, plastic fascia or any other materials. Numbers and/or letters comprising a license identification number 14 such as 617CUB may be printed on or applied to the inside of the fascia (see FIG. 1a) so as to be visible to the human eye. The rear wall 15 of the casing 12 incorporates internally threaded bolt receptors 16 for receipt of bolts for mounting of the apparatus 10.

The apparatus 10 includes both a transmitter 17 connected to an antenna 18 and a global positioning receiving system 19 connected to an antenna 20, each being located within the housing 11. The transmitter 17 is interfaced with the global positioning system 19 so as to enable position information derived from the global positioning system 19 to be transmitted.

The fascia 13 may be sealed to the casing 12 to define a sealed interior space 21 within the housing 11. A pressure valve 22 is fitted to the casing 12 to communicate with the interior space 21 to enable the housing 12 to be pressurized with air or gas. Located within the housing is a pressure or gas detector 23 which serves as an alert switch within the housing 11 to act as a tamper detecting device. Gas may be supplied to the interior to the housing or alternatively, the interior of the housing may be pressurized or evacuated through the pressure valve 22. The pressure or gas detector 23 is associated with one of a plurality of programmed microchips 24 connected to trigger the transmitter 17. The pressure or gas detector 23 will only trigger the transmitter 17 if the detector 23 fails to detect the gas, pressure, or vacuum which would indicate either tampering, or an accident, which in either case, an emergency service required would need to attend on an urgent basis.

The transmitter triggering microchip is programmed to activate the transmitter 17 to alert the satellite or telecommunications base station if any violation of the housing is detected resulting in vacuum or pressure release, for example if the fascia 13 is broken or the seal between the fascia 13 and casing 12 broken. If gas is utilized as an option for tampering detection, the gas may be an ozone friendly gas, which is non-combustible and is able to be detected by a small gas detection device.

Where the apparatus is fitted with a pressure detector, the pressure of any impact upon the pressure detector may also be detected which may be converted to analyze the impact speed.

The apparatus 10 may additionally include an electronic bar code 25 within the housing 11 rearwardly of the fascia 13 which is able to be scanned by a bar code scanner. The bar code 25 may contain all of the information of the registered vehicle to which the apparatus 10 is attached, such as the date registered and the owners particulars, such as age of owner, license status of owner and all registration details of the vehicle. A government registering department and associated authorities will have a record of the numbers and letters 14 on the fascia 13 coinciding with the relevant bar code 25 of that vehicle. Alternatively, the information contained in the bar code 25 may be stored in the series of programmable chips 22.

The numbers/letters 14 on the face or fascia 13 of the apparatus 10 may be the same as the numbers which are seen on the face of any license plate on a current motor vehicle, as the eye will see these numbers but directly behind these numbers and letters the electronic bar code connected to the aforesaid tamper sensing device may be inside the housing 11.

The housing 11 may also be fitted with a motion sensor 26 such as a movement detecting mercury switch 24 which may be electronically linked to the programmed chip system 24. The housing 11 may also include a heat detector 27 connected to the microchips 25 for alerting the system of any extreme heat detected such as fire in the vehicle or external heat application to the housing 11.

The components and devices of the apparatus 10 within the housing 11 may be solar powered through a number of solar cells 28 located around the exterior of the casing 12 for charging a battery 29 within the housing 11, or alternatively may be powered externally through an option port 30 by the 12 volt system of the vehicle to which the apparatus is attached. A voltage analyzer/regulator 31 located in the housing 11 will detect whether supply to the components and devices in the housing 11 is external or internal.

All the components and devices of the apparatus 10 are housed within a contained area in the housing 10 and suitably mounted on a motherboard 32, and the apparatus is able to be tracked by a satellite in orbit due to the components which are interfaced with the global positioning system. The information can be transmitted by the transmitting system to the satellite, or alternatively to the telecommunications base station and the information received can, at any time, be accessed by the land based monitoring computer.

Internal locking devices 33 are provided for internally locking the fascia 13 to the casing 12. Locking or unlocking of the devices 33 may be controlled externally by a code input to the programmed microchips 24 through the option port 30.

The option port 30 enables authorities to complete a manual check of any violation of the apparatus 10 through the series of programmed memory chips 24 which may contain data of any previous inconsistencies relating to the misuse of the apparatus 10, and for the transferring of any registration details, and the unlocking code for the devices 33 to the programmable micro chips 24.

The housing 11 may also incorporate a camera lens 34 for capturing visual information at the front of the apparatus 10. That information may be transmitted by the transmitter 17 or the information may be supplied through the option port 30 to any viewing apparatus inside the vehicle.

It should be noted that only one license plate apparatus is needed per vehicle. Any other coinciding license plate need only be a typical license plate.

The license plate apparatus of the present invention has a number of advantages. It provides greater safety for vehicle occupants in that if there is an accident resulting in breach of the housing 11 or tampering with or unauthorized intrusion into the housing 11, the transmitter 17 will immediately alert the monitoring ground base as to the co-ordinates. Further, if the vehicle is stolen, the monitoring station only needs to be notified of the registration number visible on the front of the license plate apparatus or the coinciding plate. The police will then be able to track and pinpoint the position of the vehicle by remote interrogation of the apparatus 10 and from information obtained from the global positioning system within the housing 11.

Any tampering of the license plate apparatus causing breach of the housing 11 will result in the transmitting system notifying the policing computer base as to the co-ordinates of the license plate apparatus due to the loss of gas or pressured vacuum. The license plate apparatus will thus ultimately reduce car theft and vehicles fitted with the license plate apparatus would eventually enjoy cheaper car insurance and should reduce registration costs in that the license plate apparatus may eliminate the need for registration labels.

The license plate apparatus' quick information supply abilities will reduce police time and costs with much less chasing due to the tracking facility. Further a parking officer together with a decoding scanner device could determine if the owner of the vehicle has any outstanding wants or warrants.

A monitoring station can access the location of any plate at any time. There would be a reduced time of arrival by emergency services at an accident, and subsequently reduced loss of life. In the event of tampering, due to the loss of pressure detected by the tamper evident device used, and the monitoring station being notified by the alert facility within a matter of seconds, response time may be rapid.

Eventually the introduction of the license plate apparatus would result in a domino effect of many reduced private costs and government department costs, less car theft, less police time, less court time and costs, less jail time and costs, the elimination of registration labels which means less department of motor transport costs. The global positioning system linked license plate apparatus means less police time used on enquiries and major vehicle accidents, ultimately saving the country billions of dollars. Ultimately these savings will be passed on to the general community in many ways, helping to raise the quality of life for that country.

What is claimed is:

1. A vehicle license plate apparatus, said apparatus comprising:
    a closed housing which is attachable externally to said vehicle and adapted to carry vehicle license information;
    geographical position identifying means within said housing,
    a transmitter within said housing which can transmit the geographical position of said vehicle derived from said geographical position identifying means to a satellite or to a telecommunications base station; and
    sensing means within said housing for activating said transmitter to transmit the geographical position of said vehicle in the event that breach of said housing is sensed.

2. The apparatus of claim 1, wherein said housing is airtight and is pressurized or depressurized through a valve, and wherein said sensing means comprises a pressure detector which activates said transmitter if the pressure changes in said housing.

3. The apparatus of claim 1 wherein said housing is airtight and contains a gas and wherein said sensing means comprises a gas detector which activates said transmitter upon sensing a loss of gas within said housing.

4. The apparatus of claim 1, further including a heat sensing means in said housing which activates said transmitter upon sensing a temperature in excess of normal ranges.

5. The apparatus of claim 1, further including an activatable and deactivatable motion sensing means in said housing which activates said transmitter upon sensing unauthorized motion of said housing.

6. The apparatus of claim 1, further including an electronic barcode within said housing for discrimination by a bar code scanner.

7. The apparatus of claim 1, further including a camera lens within said housing for capturing visual images forwardly of said housing.

8. The apparatus of claim 1, further including solar energy cells associated with said housing connected to a battery within said housing for supplying power to said apparatus.

9. The apparatus of claim 1 wherein said housing comprises first and second cooperable parts, said first part of said housing comprising a hollow open-fronted casing and said second part of said housing carrying visual information thereon comprising said vehicle license information, said second part being adapted to cooperate with, to close said first part to prevent access to the interior of said housing.

10. The apparatus of claim 9, further including an internal locking system for selectively locking together or unlocking said parts of said housing.

11. The apparatus of claim 10 wherein said internal locking system is activatable externally of said apparatus.

12. The apparatus of claim 1 wherein said housing includes an externally accessible option port connected to programmed or programmable microchips within said housing, said option port providing for the exchange of information between said programmed or programmable microchips and an external computer.

13. The apparatus of claim 12 wherein said option port is connected to a vehicle immobilizer.

14. The apparatus of claim 1, further including a pressure detector in said housing for sensing change of pressure in said housing resulting from deformation of said housing.

15. License plate apparatus for a vehicle, said apparatus comprising:

a closed housing, said housing having an internal sealed hollow space and having a front face for carrying vehicle license information;

a transmitter within said hollow space within said housing;

a global positioning system within said hollow space within said housing and interfaced to said transmitter; and sensing means associated with said housing for activating said transmitter for transmitting a position signal derived from said global positioning system to identify the position of said vehicle when breach of said housing is sensed.

16. Apparatus attachable externally to a vehicle for identifying the location of said vehicle upon attempted tampering with said apparatus, said apparatus comprising:

closed housing means, said housing means having a front face, means for carrying vehicle license information on or adjacent said front face;

geographical position identifying means and transmitter means supported rearwardly of said vehicle license information carrying means within said closed housing; and means for sensing tampering with said apparatus, said sensing means causing said transmitter means to transmit the position of said vehicle derived from said geographical position identifying means when tampering with said apparatus is sensed.

17. The apparatus of claim 16 wherein said geographical position identifying means comprises a global positioning system.

18. The apparatus of claim 16, further including a motion sensing means which activates said transmitter means upon sensing unauthorized motion of said housing.

19. The apparatus of claim 16, further comprising a vehicle immobilizer to which said apparatus is connected.

* * * * *